United States Patent [19]
Lack et al.

[11] Patent Number: 6,028,378
[45] Date of Patent: Feb. 22, 2000

[54] ELECTRIC MOTOR FOR AUXILIARY SYSTEMS OF AUTOMOTIVE VEHICLES

[75] Inventors: Peter Lack, Schorndorf; Werner Philipps, Ludwigsburg, both of Germany

[73] Assignee: ITT Automotive Europe GmbH, Frankfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,237

[22] Filed: Sep. 19, 1997

Related U.S. Application Data

[63] Continuation of application No. 08/495,688, filed as application No. PCT/EP94/00136, Jan. 20, 1994, abandoned.

[30] Foreign Application Priority Data

Jan. 23, 1993 [DE] Germany ............................ 43 01 744

[51] Int. Cl.$^7$ .......................... H02K 21/26; H02K 17/16; H02K 5/02
[52] U.S. Cl. .............................. 310/51; 310/89; 310/154; 310/211

[58] Field of Search ..................................... 310/211, 261, 310/254, 154, 156, 51, 42, 43, 67 R, 89; 29/596, 597, 598

[56] References Cited

U.S. PATENT DOCUMENTS

| | | | |
|---|---|---|---|
| 3,482,125 | 12/1969 | Fleckenstein | 310/42 |
| 3,887,826 | 6/1975 | Apostoleris | 310/43 |
| 4,707,630 | 11/1987 | Tomite et al. | 310/154 |
| 4,930,201 | 6/1990 | Brown | 29/598 |
| 4,973,871 | 11/1990 | Bisantz | 310/154 |
| 5,219,214 | 6/1993 | Savage et al. | 303/115.2 |

FOREIGN PATENT DOCUMENTS

| | | | |
|---|---|---|---|
| 1 037 572 | 8/1958 | Germany. | |
| 2111763 | 12/1982 | United Kingdom | 310/89 |

*Primary Examiner*—Nestor Ramirez
*Assistant Examiner*—Tran N Nguyen
*Attorney, Agent, or Firm*—Ratner & Prestia

[57] ABSTRACT

An electric motor with a multi-pole rotor and a multi-pole stator. The stator is mounted in a housing, the poles of the stator extend parallel to the direction of the rotor axis, and the rotor slots run helically with respect to the rotor axis. The stator magnets are mounted to the inside wall of the housing by means of gluing. The housing features a sound-insulating wall thickness and the helix angle of the rotor slots is approximately 8° to 20°.

19 Claims, 1 Drawing Sheet

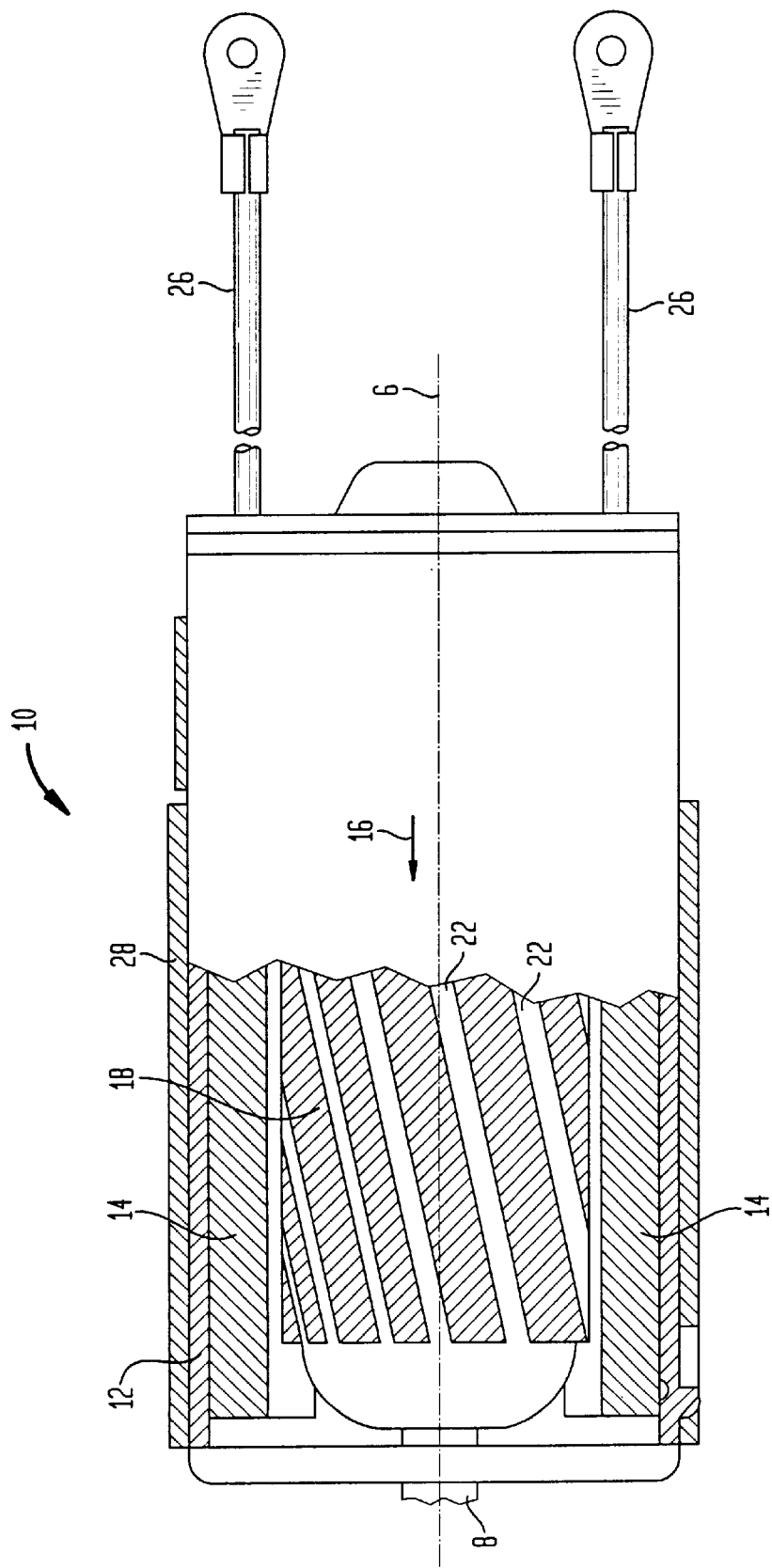

ns of Automotive Vehicles

ELECTRIC MOTOR FOR AUXILIARY SYSTEMS OF AUTOMOTIVE VEHICLES

This application is a continuation of application Ser. No. 08/495,688 filed Jan. 5, 1996, now abandoned.

This application is the U.S. national-phase application of PCT International Application No. PCT/EP94/00136, filed Jan. 20, 1994.

BACKGROUND OF THE INVENTION

This invention relates to an electric motor with a multi-pole rotor and a multi-pole stator. The stator of the present invention is mounted in a housing. The poles of the stator extend parallel to the rotor axis and the rotor slots run helically with respect of the rotor axis.

German Patent DE 25 56 240 describes a drive mechanism for auxiliary systems of automotive vehicles such as windshield wipers. In that Patent, the armature slots run helically with respect to the motor axis. This results in a reduction of the pulsating torque and causes the motor to run more quietly. However, it is well known that motor operation produces troublesome noises which are typically caused by the rotation of the armature and the natural vibrations of the stator.

SUMMARY OF THE INVENTION

It is an object of this invention to remedy this problem with an especially quiet-running electric motor.

According to the present invention, the object, set forth above, is achieved by attaching the stator magnets to the inside wall of the housing by means of gluing. The housing features a sound-insulating wall thickness or is partially composed of sound-insulating material. In addition, the helix angle of the rotor slots is between 8° and 20°.

The fundamental idea of this invention, namely that of motor sound insulation, results from the combination of motor housing thickness, stator magnet gluing and rotor slot helix angle. An optimal choice of the individual parameters will ensure quiet, noise-abated electric motor operation.

With regard to the installation of the stator magnets, the preferred embodiment provides for attachment of the stator magnets over a portion, or the entirety of their surface to the inside wall of the housing. Moreover, tests have revealed that good sound insulation of the motor is accomplished with a housing wall thickness of at least 2 mm. Further increases in the housing wall thickness enhance the sound insulation properties of the motor. However, this may result in the undesirable effect of increasing the weight of the motor. In order to overcome this problem, another embodiment of this invention provides for the addition of a casing of silencing material. In this embodiment, the casing is designed as an add-on component and is attached to the motor housing. The casing material is a plastic and may be permanently attached to the motor housing or may be removable. Foamed plastic materials are well suited for these purposes as they feature a high silencing coefficient. In addition, foamed plastic materials are relatively low-weight. Therefore, the weight of the casing is a fraction of the total weight of the motor.

BRIEF DESCRIPTION OF THE DRAWING

A preferred embodiment of this invention is shown in the single FIGURE and will be explained in detail below.

DETAILED DESCRIPTION OF THE INVENTION

The drawing shows a side view, partially in section, of the electric motor 10 of the present invention. The electric motor 10 has a multi-pole rotor 16 and a stator which is accommodated in a housing 12, which is disposed radially outward relative to stator poles 14. The stator poles 14 extend parallel to the direction of the rotor axis 6 while the rotor slots 22 run helically with respect to the rotor axis 6. The stator magnets 14 are attached to the inside wall of the housing 12 by means of gluing. The wall thickness of the housing 12 is selected to provide the required strength and sound insulation properties. In the preferred embodiment, the wall thickness of the housing is approximately 2 mm, with 2.5 mm being considered particularly advantageous. In order to further increase the silencing properties of the motor, the outside wall of the housing 12 is provided with an additional casing 28 which, preferably, consists of plastic material and is designed as an add-on component. The casing 28 is preferably made from foamed plastic material so that the total weight of the motor is hardly increased. The stator magnets 14 are attached to the inside wall of the housing 12 along the entire surface. However, partial attachment of the stator magnets 14 is also possible.

Further, it can be seen from the drawing that the rotor 16 has a shaft 8 which can be connected to, for example, a windshield wiper gear (not shown). The electric motor 10 is supplied with electric current via lines 26.

We claim:

1. An electric motor with a multi-pole rotor having an axis and defining rotor slots and with a multi-pole stator having poles and magnets, which stator is accommodated in a housing wherein the housing includes a detachable casing of sound-insulating material and the poles of which stator extend parallel to the direction of the rotor axis while the rotor slots run helically in respect of the rotor axis, characterized in that the stator magnets are connected with the inside wall of the housing by means of gluing, in that the housing features a sound-insulating wall thickness, and in that the helix angle of the rotor slots is 8 to 20°, wherein the combination of gluing the stator magnet, the sound-insulating wall thickness, and the helix angle minimizes noise during operation and wherein the housing is disposed radially outward relative to the poles of the stator.

2. An electric motor as claimed in claim 1, characterized in that the stator magnets are connected using glue over the entire surface of the inside wall of the housing and the outside wall of the poles of the stator.

3. An electric motor as claimed in claim 2, characterized in that the wall thickness of the housing is at least 2 mm.

4. An electric motor as claimed in claim 3, characterized in that the wall thickness is about 2.5 mm.

5. An electric motor as claimed in claim 1, characterized in that the housing consists of a basic body carrying the stator poles and the detachable casing of sound-insulating material.

6. An electric motor as claimed in claim 5, characterized in that the casing is designed as an add-on component and is disposed outside of the basic body.

7. An electric motor as claimed in claim 6, characterized in that the casing is of plastic material.

8. An electric motor as claimed in claim 1, wherein said housing is formed from a sound-insulating material which increases the sound-insulating properties of said housing.

9. An electric motor as claimed in claim 1, wherein the stator magnets are connected partially using glue between the inside wall of the housing and the outside wall of the poles of the stator.

10. An electric motor comprising:

a housing having a selected wall thickness which increases the sound-insulating properties of said housing, wherein the housing includes a detachable casing of sound-insulating material;

a multi-pole rotor within said housing and having rotor slots running helically at a helix angle of between 8 to 20° with respect to the axis of said rotor; and a multi-pole stator within said housing, which housing is disposed radially outward relative to said stator, and having poles mounted to the inside wall of said housing by glue and extending parallel to the axis of said rotor, wherein the combination of gluing the stator, the sound-insulating wall thickness and the sound-insulating material, and the helix angle minimizes noise during operation.

11. An electric motor as recited in claim 10 wherein the wall thickness of said housing is at least 2 mm.

12. An electric motor as recited in claim 11 wherein the wall thickness of said housing is 2.5 mm.

13. An electric motor as recited in claim 10 wherein said housing includes:

(a) a basic body to which said poles of said multi-pole stator are mounted, and (b) the detachable casing of sound-insulating material.

14. An electric motor as recited in claim 13 wherein said casing is disposed outside of said basic body.

15. An electric motor as recited in claim 14 wherein said outside casing is formed of plastic material.

16. An electric motor as recited in claim 10 wherein that surface by which each of said stator poles is mounted to said housing is entirely covered with glue.

17. An electric motor as recited in claim 10 wherein that surface by which each of said stator poles is mounted to said housing is partially covered with glue.

18. An electric motor comprising:

a housing having a selected wall thickness which increases the sound-insulating properties of said housing, wherein the housing includes a detachable casing of sound-insulating material;

a multi-pole rotor within said housing and having rotor slots running helically at a helix angle of between 8 to 20° with respect to the axis of said rotor;

a multi-pole stator within said housing, which housing is disposed radially outward relative to said stator, and having poles extending parallel to the axis of said rotor; and means for attaching the outside wall of said poles to the inside wall of said housing means consisting of glue, and the combination of gluing the stator, the sound-insulating wall thickness and the sound-insulating material, and the helix angle minimizes noise during operation.

19. An electric motor as claimed in claim 18, wherein the surface by which each of said stator poles is mounted to said housing is entirely covered with glue.

* * * * *